United States Patent [19]

Fromfield

[11] 4,179,096
[45] Dec. 18, 1979

[54] VALVE MEMBER FOR PILOT OPERATED VALVES

[75] Inventor: James P. Fromfield, Belleville, N.J.

[73] Assignee: Automatic Switch Company, Florham Park, N.J.

[21] Appl. No.: 892,621

[22] Filed: Apr. 3, 1978

[51] Int. Cl.² .............................................. F16K 31/10
[52] U.S. Cl. ..................................... 251/38; 251/30; 251/45
[58] Field of Search ..................... 251/30, 44, 45, 46, 251/38

[56] References Cited

U.S. PATENT DOCUMENTS

| | | | |
|---|---|---|---|
| 2,738,157 | 3/1956 | Vargo | 251/45 |
| 3,208,716 | 9/1965 | Rolfe | 251/30 |
| 3,593,957 | 7/1971 | Dolter et al. | 251/30 |

FOREIGN PATENT DOCUMENTS

| | | | |
|---|---|---|---|
| 1048455 | 1/1959 | Fed. Rep. of Germany | 251/30 |
| 351465 | 2/1961 | Switzerland | 251/45 |

Primary Examiner—Martin P. Schwadron
Assistant Examiner—G. L. Walton
Attorney, Agent, or Firm—Alan H. Levine

[57] ABSTRACT

A valve member including a flexible diaphragm movable into and out of engagement with a valve seat to close and open the valve, respectively. A rigid support plate rests against the face of the diaphragm opposite the face which engages the valve seat. A stem projects from the plate, through a hole in the diaphragm and into the orifice surrounded by the valve seat. The diaphragm and plate are not rigidly secured together, so that the entire diaphragm is free to flex with respect to the support plate. A pilot passageway may extend completely through the plate and stem. The stem is long enough such that the lower end of the pilot passageway is below the plane of the valve seat even when the valve is open. An abutment, such as an outwardly projecting bead, on the lower end of the stem prevents accidental separation of the plate and diaphragm before they are assembled with a valve.

4 Claims, 5 Drawing Figures

U.S. Patent    Dec. 18, 1979    4,179,096
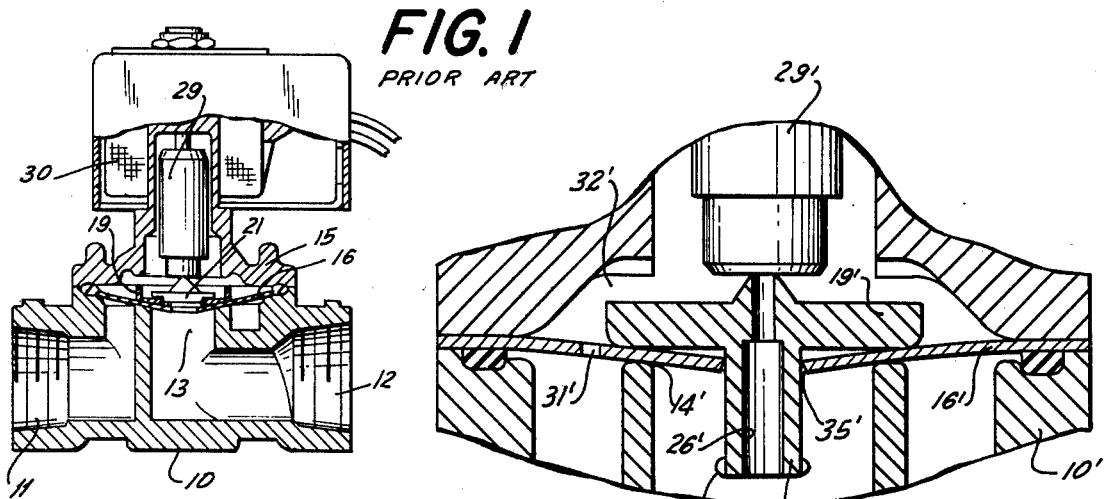
FIG. 1 PRIOR ART
FIG. 2
FIG. 4
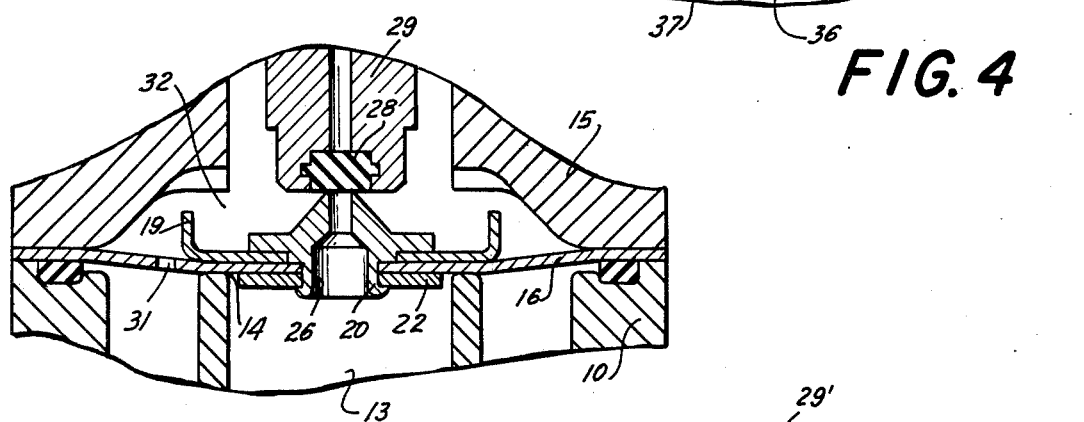
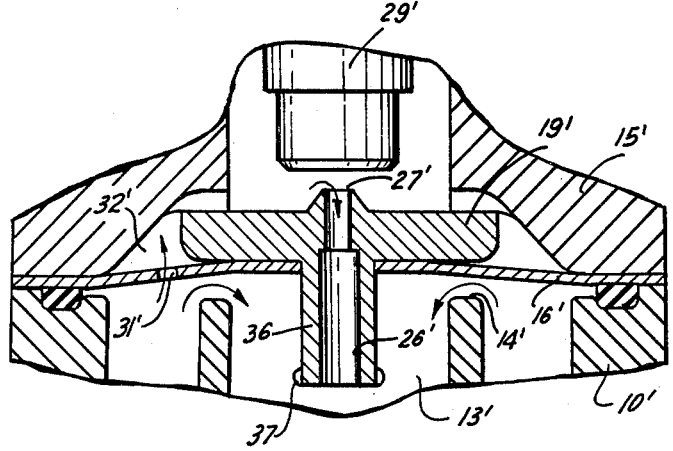
FIG. 5
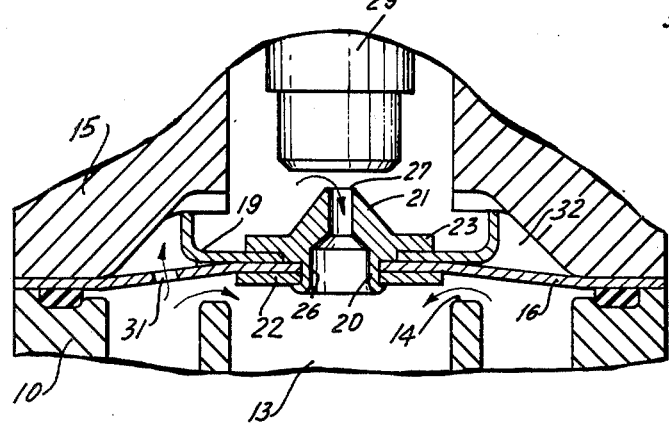
FIG. 3

VALVE MEMBER FOR PILOT OPERATED VALVES

This invention relates to pilot operated valves, and more particularly to such valves which employ a flexible diaphragm as the valve member.

In such a valve, it is common practice to affix a rigid support plate to the center of the face of the diaphragm opposite the face which engages the valve seat to close the valve. The valve seat surrounds an orifice through which the inlet and outlet ports of the valve communicate when the diaphragm moves away from the valve seat to open the valve. The function of the support plate is to reinforce the diaphragm, especially when the valve is closed, so that the diaphragm is not torn by the differential pressure across it. The support plate also provides a rigid surface between which and the valve seat the flexible diaphragm is squeezed to provide a reliably sealed closure when the valve is closed.

Usually, the support plate is affixed to the diaphragm by riveting, staking, or other mechanical means. Such mechanical fastening presents a number of problems. The fastening means squeezes and hence distorts the flexible diaphragm material adversely affecting the sealing ability of the diaphragm at low pressures. Mechanical fastening adds time and expense to assembly of the diaphragm and support plate. A rigid connection between the support plate and the diaphragm inhibits the flexibility of the diaphragm in its central region, and hence restricts fluid flow through the orifice when the valve is operating at low inlet pressures.

It is an object of the invention to overcome these problems by providing a valve member comprising a flexible diaphragm and a rigid support plate which rests against the diaphragm, but is not rigidly fixed to the diaphragm. As a result of there being no fastening means rigidly securing the diaphragm and support plate together, the diaphragm is not distorted, the diaphragm and plate are quickly assembled, and the diaphragm remains flexible across its entire area.

In this latter connection, it is an object of the invention to provide a valve member in which stiffer than usual diaphragm materials can be used since a larger than usual area of the diaphragm is permitted to flex. Stiffer diaphragm materials tend to be more rugged and hence longer lasting than more flexible materials.

Another feature of the invention involves a problem presented when fabric reinforced elastomer type diaphragms are employed. The fluid being controlled by the valve tends to penetrate into the diaphragm material, a phenomenon known as "wicking", which causes blistering of the elastomer and eventual failure of the diaphragm. In a diaphragm according to the present invention, a stem projects from the support plate through a central hole in the diaphragm, to keep the plate centered on the diaphragm. Since the stem is not tightly fastened in the hole, any fluid which penetrates into the diaphragm can seep out through the edge of the hole, thus minimizing or eliminating blistering.

Additional objects and features of the invention will be apparent from the following description in which reference is made to the accompanying drawings.

In the drawings:

FIG. 1 is a cross-sectional view of a conventional pilot operated valve employing a diaphragm valve member;

FIGS. 2 and 3 are fragmentary views, on an enlarged scale, of a portion of FIG. 1, showing the valve closed and open, respectively;

FIGS. 4 and 5 are view similar to FIGS. 2 and 3 showing a valve member according to the present invention.

A conventional pilot operated valve of the type to which this invention relates is shown in FIGS. 1–3. The valve includes a valve body 10 having an inlet port 11, an outlet port 12, and orifice 13 between the ports, and a valve seat 14 surrounding the orifice. A bonnet 15 is mounted on body 10, such as by screws, not shown, and the peripheral edge of a diaphragm 16 is squeezed tightly between the bonnet and body. The diaphragm is made of rubber or other suitable flexible material. Diaphragm 16 flexes downwardly into engagement with valve seat 14 to close the valve (FIG. 2) and flexes upwardly away from seat 14 to open the valve (FIG. 3).

A cup shaped support plate 19, made of metal or other rigid material, is fixed to the face (in this example the upper face) of diaphragm 16 opposite the face (in this example the lower face) of the diaphragm which engages valve seat 14. A central hole in plate 19 is in registry with a central hole in diaphragm 16, and a downwardly projecting hollow stem 20 of a fitting 21 extends through the aligned holes. The lower end of stem 20 is bent outwardly and upwardly, to enlarge it, against a metal washer 22 engaging the lower face of diaphragm 16. In this way, plate 19, diaphragm 16, and washer 22 are tightly squeezed between the enlarged lower end of stem 20 and a flange 23 of fitting 21.

A through hole 26 in fitting 21 serves as a pilot passageway and terminates at its upper end in a pilot valve seat 27 (FIG. 3). A resilient pilot valve disk 28 (FIG. 2) cooperates with seat 27, the valve disk being carried at the lower end of a vertically movable solenoid armature 29. Armature 29 slides within a tube surrounded by an electrical solenoid 30, a spring (not shown) within the tube constantly urging the armature downwardly. A small bleed hole 31 in diaphragm 16 provides for constant flow of high pressure fluid from inlet port 11 into the chamber 32 above diaphragm 16.

When solenoid 30 is deenergized (FIG. 2) armature 29 is down and valve disk 28 closes pilot passageway 26. Therefore, chamber 32 fills with high pressure fluid, through bleed hole 31, and the pressure in chamber 32 maintains diaphragm 16 against valve seat 14 to close the valve, i.e., prevent flow from port 11 to port 12. When solenoid 30 is energized, armature 29 moves upwardly (FIG. 3) opening pilot passageway 26 through which the pressurized fluid in chamber 32 flows to outlet port 12. As a result, diaphragm 16 rises opening orifice 13 and permitting flow from port 11 to port 12.

A valve member chosen to illustrate the present invention is shown in FIGS. 4 and 5, wherein parts corresponding to the parts of FIGS. 1–3 bear the same reference numerals followed by a prime. The valve member includes a diaphragm 16' and a support plate 19'. However, no means whatsoever, such as fitting 21, is provided for rigidly securing the plate and diaphragm together. Diaphragm 16' is formed with a central hole 35 through which a stem 36, projecting downwardly from plate 19', extends. The interengagement of stem 36 and hole 35 keeps plate 19' centered on diaphragm 16'. A pilot passageway 26' extends completely through stem 36 and plate 19' and terminates at its upper end in pilot valve seat 27'.

It has been found desirable to elongate stem 36, as shown in FIGS. 4 and 5, so that the lower end of pilot passageway 26' is well below the plane of valve seat 14' when the valve is opened. In this way, the high pressure fluid flowing through passageway 26' from chamber 32' exits into a region of high velocity flow through orifice 13', improving the operation of the valve. The elongated stem 36 also eliminates any possibility of the stem and hole 35 becoming disengaged during operation of the valve. Additionally, it is advantageous to provide a radially outwardly projecting bead 37, or similar abutment, having an external diameter larger than the diameter of hole 35 in diaphragm 16' to prevent accidental disassembly of plate 19' and the diaphragm while the parts are in inventory and being handled, before they are incorporated in a valve.

In the embodiment of the invention illustrated in FIGS. 4 and 5 a through hole or pilot passageway 26' is furnished in the plate 19' and stem 36. This need not always be the case. In some pilot operated valves, usually those of larger size, the pilot valve member is located remote from the diaphragm and controls flow through a pilot passageway comprising drilled holes in the valve body. When a valve member according to this invention is used in such a valve, the through hole 26' is not present.

The present invention is based on a recognition that a valve of the type shown in FIG. 1 operates perfectly satisfactorily with a valve member as shown in FIGS. 4 and 5 wherein there is no rigid connection between support plate 19' and diaphragm 16'. The pressures within the valve always keep the support plate and diaphragm together. When the valve is closed (FIG. 4) high pressure fluid in chamber 32 acts on the entire area of the upper surface of plate 19' but only on the annular area of the lower surface of the plate radially outwardly of valve seat 14'. The area of the lower surface of plate 19' within valve seat 14' is exposed to the low pressure in orifice 13'. Thus, a net downward force acts on plate 19' keeping it against diaphragm 16'. When the valve is open (FIG. 5) the net upward force on diaphragm 16' keeps it against plate 19'.

It will be appreciated that with no fastening means rigidly fastening diaphragm 16' to plate 19', the diaphragm is not distorted, and the diaphragm is free to flex across its entire area extending radially from the edge of hole 35 to the point at which the diaphragm is clamped between the body 10' and bonnet 15'.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. In a pilot operated valve having a valve body formed with an inlet port, an outlet port, an orifice between the ports, and a valve seat surrounding the orifice,
   a valve member cooperable with the valve seat to close and open the valve, said valve member comprising:
   a flexible diaphragm within the valve body movable into direct engagement with the valve seat to close the valve and out of engagement with the valve seat to open the valve, said diaphragm having a hole in its region surrounded by the valve seat when the valve is closed,
   a rigid support plate resting against the face of said diaphragm opposite the face which engages the valve seat, said support plate having a diameter at least as large as the diameter of the valve seat so that said rigid support plate presses said diaphragm against the valve seat when the valve is closed,
   a stem projecting from said plate through the hole in said diaphragm, and
   said valve member being devoid of means for rigidly securing said diaphragm and plate together so that the portion of said diaphragm within the orifice surrounded by the valve seat is free to flex away from the lower surface of said support plate.

2. A valve member as defined in claim 1 including a pilot passageway extending completely through said plate and stem.

3. A valve member as defined in claim 2 wherein said stem has a length such that the lower end of said pilot passageway is below the plane of the valve seat when the valve is open.

4. A valve member as defined in claim 1 including an outwardly projecting abutment on the lower end of said stem, the external dimension of said abutment being larger than the diameter of the hole in said diaphragm.

* * * * *